United States Patent [19]
Ogiwara

[11] Patent Number: 6,061,192
[45] Date of Patent: May 9, 2000

[54] METHOD AND CIRCUIT FOR PROVIDING FEEDBACK IN A PRE-AMPLIFIER FOR A MULTI-HEAD DISK DRIVE

[75] Inventor: Hisao Ogiwara, Plano, Tex.

[73] Assignee: Texas Instruments Incorporated, Dallas, Tex.

[21] Appl. No.: 08/912,267

[22] Filed: Aug. 18, 1997

[51] Int. Cl.[7] .................................................. G11B 5/09
[52] U.S. Cl. ............................... 360/46; 360/67; 360/63; 360/66; 327/54; 327/538; 327/307
[58] Field of Search .................. 360/46, 67, 63, 360/66; 327/54, 538, 307

[56] References Cited

U.S. PATENT DOCUMENTS

| | | | |
|---|---|---|---|
| 4,786,993 | 11/1988 | Jove et al. | 360/67 |
| 5,534,818 | 7/1996 | Peterson | 327/545 |

Primary Examiner—Aristotelis M. Psitos
Assistant Examiner—Dan I. Davidson
Attorney, Agent, or Firm—W. Daniel Swayze, Jr.; Wade James Brady, III; Richard L. Donaldson

[57] ABSTRACT

A system for providing feedback to a selected read head in a multi-head disk drive includes first and second feedback circuits is disclosed. A first feedback circuit 200 provides for correction of the output of the selected read head during normal operation. The first feedback circuit 200 produces a differential output current proportional to an offset voltage detected on the read head output nodes 103 and 104. This differential output current charges external capacitor 190. The voltage across capacitor 190 is supplied to voltage inputs of the selected read head as a feedback voltage. When the feedback voltage reaches the desired level, nodes 103 and is 104 equalize, as do the output currents of the first feedback circuit 200. The second feedback circuit 300 provides for quick recovery of the system after a change in read heads. The second feedback circuit 300 provides an amplified output current to capacitor 190, causing capacitor 190 to adjust to the desired charge level more quickly than it would if only the first feedback circuit 200 were in operation.

19 Claims, 2 Drawing Sheets

6,061,192

METHOD AND CIRCUIT FOR PROVIDING FEEDBACK IN A PRE-AMPLIFIER FOR A MULTI-HEAD DISK DRIVE

TECHNICAL FIELD OF THE INVENTION

This invention relates generally to the field of disk drive circuits and more particularly to a method and circuit for providing feedback in a pre-amplifier for a multi-head disk drive.

BACKGROUND OF THE INVENTION

In a hard disk drive, data is stored in a medium of magnetic material on the surface of the disk. The data is generally stored in concentric tracks, each track having a sequence of regions with opposing magnetic polarities. Thus, as one travels along the track, a change in polarity represents a "one," whereas the absence of a change in polarity represents a "zero."

To read the data from the disk, a magneto-resistive head is run along the track just above the surface of the disk. A change in polarity on the disk causes a change in the resistance of the read head. This change can be used to produce an output current from the read head circuitry. This is generally accomplished by driving two initially equal currents into the read head circuit. A change in the resistance of the head, which occurs when a flux change or "one" is detected on the disk, will result in the two output currents becoming unequal. A differential current output is therefore provided on two output lines from the read head. This differential current can be converted to a voltage, which in turn can be amplified and read by signal processing electronics.

A hard disk drive (HDD) unit generally contains several disks or platters in a column, each disk having a read head on either side of the disk. Generally, the output from all of the read heads will be channeled through one feedback and preamplifier circuit. Thus, only one read head is selected for reading by a switching system at any given time.

Each read head has slightly different magneto-resistive characteristics. A feedback circuit is used to correct for the individual characteristics of the selected read head. The feedback circuit senses an offset or differential current in the read head output when no flux change is detected (a "zero") on the disk. Since there should be no output when no flux change is being detected, the feedback circuit applies a small bias voltage to the read head. This bias voltage causes the output of the read head to become equalized. Thus, no differential current is produced as output by the read head unless a flux change is detected.

Problems arise when the switching system switches from one read head to another. Because magneto-resistive characteristics vary slightly from head to head, the bias voltage produced by the feedback circuit must likewise vary depending on which read head is selected. The design of the feedback circuit is such that a certain amount of time is required to fully respond to a change in the required compensating voltage. Thus, after a read head change, the output of the read channel will be under- or over-compensated until the feedback circuit adjusts, resulting in a temporarily incorrect output signal.

It is desirable to shorten the time required to adjust the read circuit feedback after a change in read heads. It is also desirable to do so without affecting the performance of the feedback circuit during normal operation.

SUMMARY OF THE INVENTION

A method for providing feedback in a pre-amplifier for a multi-head disk drive is disclosed. The method comprises the steps of (1) generating first and second currents in response to a read head bias voltage; (2) generating third and fourth currents in response to the read head bias voltage; (3) amplifying a selected one of the third and fourth feedback currents to produce an amplified current; (4) supplying the first current to a first charge plate of an external capacitor; (5) supplying the second current and the amplified current to a second charge plate of the external capacitor; (6) supplying a potential level associated with the first charge plate of the capacitor to a first voltage input of the read head circuit; and (7) supplying a potential level associated with the second charge plate of the capacitor to a second voltage input of the read head circuit.

A circuit for providing feedback to a selected read head in a multi-head disk drive read circuit in accordance with the invention comprises (1) a first feedback circuit for receiving an output voltage from first and second voltage output nodes of the read circuit, and for providing first and second output currents to corresponding first and second charge plates of a capacitor; (2) a second feedback circuit for receiving the output voltage from the voltage output nodes of the read circuit, and for providing third and fourth output currents to the first and second charge plates, respectively, of the capacitor; (3) first and second feedback lines for supplying voltages associated with the first and second charges plates, respectively, of the capacitor to corresponding first and second voltage inputs of the selected read head circuit; and (4) a switch for activating the second feedback circuit.

A technical advantage of the present invention is that a method and circuit for providing feedback in a pre-amplifier for a multi-head disk drive is provided. Another technical advantage is that the invention provides for quicker adjustment of feedback after a change in read heads than was provided by prior art systems. Another technical advantage is that the second feedback circuit is inactive during normal operation of the disk drive, activating only after a change in read heads. Another technical advantage is that the operation of the first feedback circuit is not detrimentally affected by the operation of the second feedback circuit.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE INVENTION

The preferred embodiment of the present invention and its advantages are best understood by referring to FIGS. 1 through 4 of the drawings, like numerals being used for like and corresponding parts of the various drawings.

Figure 1:
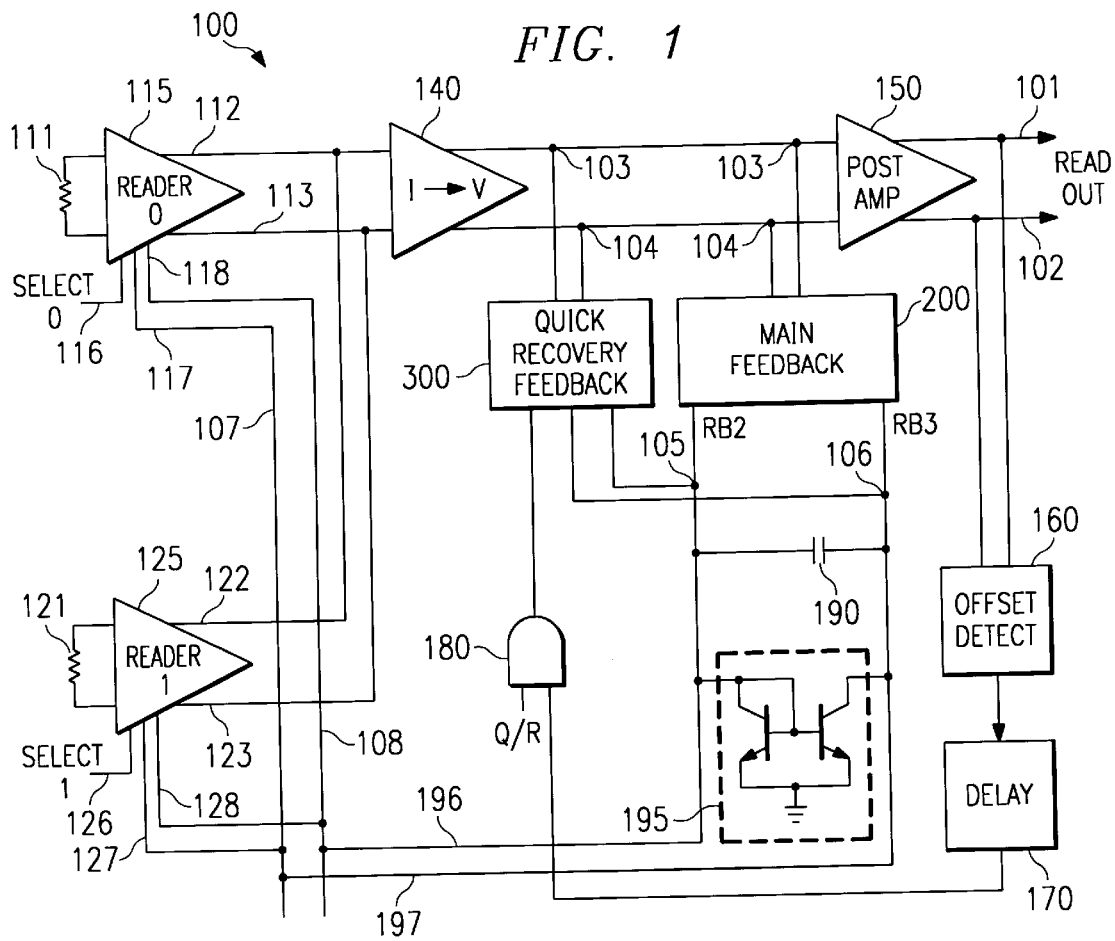
FIG. 1 is an overall block diagram of a hard disk drive read channel.

Referring to FIG. 1, a hard disk drive read circuit 100 which incorporates quick recovery feedback circuit 300 in accordance with the invention is shown. Read circuit 100 includes magneto-resistive read heads 111 and 121. For illustrative purposes, only two read heads are shown.

However, it will be understood by those skilled in the art that any number of read heads could be incorporated into the design of read circuit 100.

Read head 111 is associated with read head circuit 115, which includes a select input 116, voltage inputs 117 and 118 and current outputs 112 and 113. Likewise, read head 121 has an associated read head circuit 125 which includes select input 126, voltage inputs 127 and 128 and current outputs 122 and 123.

Only one read head circuit at a time may be activated by its select input 116 or 126. Therefore, only the operation of read head 111 and associated read head circuit 115 will be described. However, it should be noted that read head circuit 125, and any other read heads incorporated into the design of read circuit 100, would operate according to the same principles.

When read head circuit 115 is activated by a signal on select input 116, a current is sunk on select input 116, and the voltages on voltage inputs 117 and 118, as well as the resistance of read head 111, cause output currents on output lines 112 and 113. As read head 111 passes over the surface of the hard disk (not shown), the resistance of read head 111 changes, resulting in a differential current output on output lines 112 and 113. Thus, when read head 111 senses a flux change in one direction, the current output on line 112 will be greater than the current output on line 113. Conversely, when read head 111 senses a flux change in the other direction, the current on output line 113 will be greater than the current on output line 112.

Current-to-voltage converter 140 converts the differential current on lines 112 and 113 to a potential difference between nodes 103 and 104. Post-amplifier 150 amplifies this voltage, and the amplified voltage is read out on lines 101 and 102.

Figure 2:
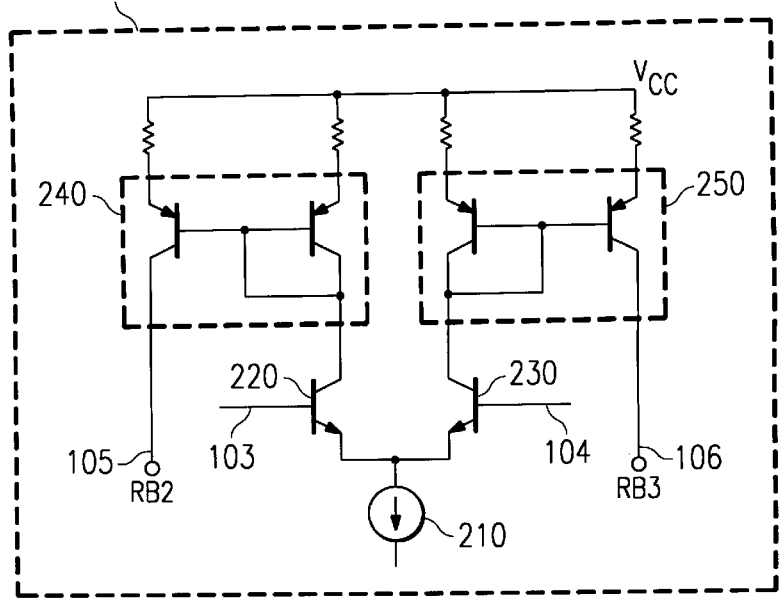
FIG. 2 is an illustration of the main feedback circuit for the read channel.

Referring to FIG. 2, a diagram of main feedback circuit 200 is shown. The voltages of nodes 103 and 104 are supplied to the bases of matched transistors 220 and 230, respectively. A constant current sink 210 is connected to and draws a constant current from the emitters of transistors 220 and 230. The collectors of transistors 220 and 230 are connected to current mirrors 240 and 250, respectively.

The operation of the main feedback circuit is as follows. When no flux change is detected on the hard disk by read head 111, nodes 103 and 104 should be at the same potential. Any potential difference between nodes 103 and 104 would be a read head bias which must be corrected. The primary object of the main feedback circuit is to provide feedback which will correct for this bias.

If there is a potential difference between nodes 103 and 104, then one of the transistors 220 or 230 will be caused to conduct slightly less than half the current sunk by current sink 210, while the other transistor 220 or 230 will be caused to conduct slightly more than half the current sunk by current sink 210. Current mirror 240 will cause the amount of current conducted by transistor 220 to be driven to node 105. Likewise, current mirror 250 will cause a current equal to that conducted by transistor 230 to be driven to node 106.

Referring back to FIG. 1, it can be seen that, as a result of the action of main feedback circuit 200, nodes 105 and 106 will receive slightly different currents. Capacitor 190, which is connected between nodes 105 and 106, will act as a low pass filter, filtering out any current spike which occurs at node 105 when a complementary current spike occurs at node 106. Capacitor 190 also effectively converts a current difference between nodes 105 and 106 into an increasing voltage difference between lines 196 and 197. When the current driven to node 105 is slightly less than the current driven to node 106, the potential of line 196 will slowly drop relative to the potential of line 197 as charge accumulates on the plates of capacitor 190. Capacitor 190 is an external capacitor, not residing on the same substrate as the other components of read circuit 100.

Current mirror 195, which is connected between the outputs of the main feedback circuit 200, operates to subtract an equal current from both output lines. As a result, capacitor 190 sees only a small differential current, which it converts into a voltage difference on lines 196 and 197 as previously described.

This increasing voltage difference on lines 196 and 197 is fed back via lines 117 and 118 to read head circuit 115. When the voltage difference between lines 196 and 197 has reached a level sufficient to correct for the output bias of read head circuit 115, nodes 103 and 104 will reach the same potential, and the current outputs of main feedback circuit 200 will equalize. At this point, the charge held by capacitor 190 will stabilize, holding the read head circuit input voltages on lines 117 and 118 at the desired values.

One limitation of main feedback circuit 200 is that it cannot respond quickly to a change in the bias voltage between nodes 103 and 104. External capacitor 190, which has a large capacitance, carries a stable amount of charge during normal operation. When the output currents at nodes 105 and 106 change, as when a new read head is selected for output, capacitor 190 must be charged or discharged to reach a new charge level associated with the new feedback level.

The charging or discharging of capacitor 190 causes a delay before the feedback voltages carried by lines 196 and 197 attain their desired values. Thus, after a read head change, the output of the read channel will be under-or over-compensated until the charge carried by external capacitor 190 adjusts to a new level. This results in a temporarily incorrect output signal.

To shorten the time required to adjust after a read head change, it is desirable to temporarily amplify the current difference between nodes 105 and 106, so as to more quickly charge or discharge capacitor 190. This current amplification is accomplished by quick recovery feedback circuit 300, shown in FIG. 1. Quick recovery feedback circuit 300 receives analog voltage inputs from nodes 103 and 104 and a logic input from AND gate 180. Circuit 300 drives output currents to nodes 105 and 106. Quick recovery feedback circuit 300 is therefore connected into circuit 100 in parallel with main feedback circuit 200.

Figure 3:
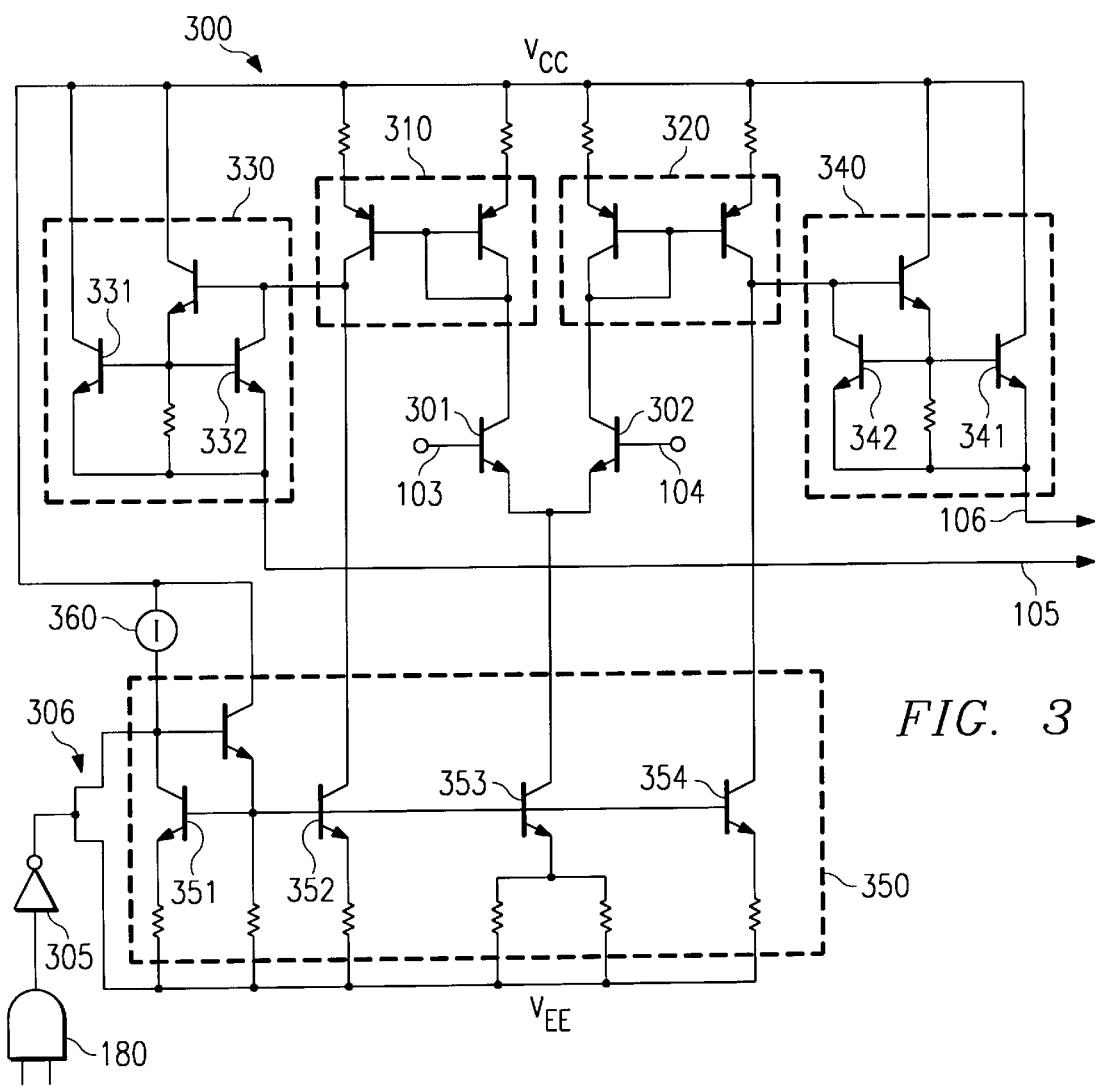
FIG. 3 is an illustration of a quick recovery feedback circuit in accordance with the invention.

Referring to FIG. 3, quick recovery feedback circuit 300 is shown in detail. The operation of this circuit is as follows. AND gate 180 receives input signals indicating when operation of quick recovery feedback circuit 300 is necessary. One input signal comes from the read head switching system (not shown), indicating that a read head change is occurring or has occurred. This signal remains high for a period of time after the read head change. The other input signal comes from offset detect block 160 and delay block 170. This signal indicates that there is a voltage difference between lines 101 and 102. Thus, after a read head change occurs, the output of AND gate 180 will remain high until some time after the output voltages on lines 101 and 102 have been equalized.

The output of AND gate 180 is inverted and supplied to the base of transistor switch 306. During normal operation (without read head changes), the output of AND gate 180 is low and switch 306 acts to shunt the current from current source 360 to ground, thus rendering quick recovery feedback circuit 300 inactive. During or after a transition between read heads, the output of AND gate 180 is high, and switch 306 is open. This forces the current from current source 360 through programming transistor 351 of current mirror device 350, triggering the operation of quick recovery feedback circuit 300.

The components of current mirror device 350 are configured so that a constant current (I) through transistor 351 will result in an equal current (I) being conducted by transistors 352 and 354, and twice the current (2I) being conducted by transistor 353. Transistor 353 is therefore a constant current sink which functions in a matter analogous to constant current sink 210 in main feedback circuit 200. The voltages from nodes 103 and 104 are supplied to the bases of transistors 301 and 302, respectively.

As in the main feedback circuit, a difference between the voltages on nodes 103 and 104 will result in currents slightly more or less than I being passed by each of the transistors 301 and 302. The currents through transistors 301 and 302 will be duplicated by the currents through current mirrors 310 and 320 respectively. Since one of the transistors 301 or 302 will be drawing slightly more than I, that same current will be driven by one of the current mirrors 310 or 320.

Transistors 352 and 354 act as constant current sinks, each sinking a current approximately equal to I. Thus, one of the current mirrors 310 or 320 will be driving more current than is sunk by its respective current sink 352 or 354. Therefore, an excess current will be driven through one of the current boost devices 330 or 340.

It should be noted that one of the current mirrors 310 or 320 will drive less current than its respective current sink transistor 352 or 354 seeks to sink. The current sink transistor 352 or 354 will therefore be saturated, and its base current will be increased. As a result, there is no current flow to or from the respective current boost device 330 or 340.

Each current boost device 330 or 340 is configured in a manner similar to a current mirror, but with a lower resistance on the collector of the mirroring transistor 331 or 341 than is on the collector of the programming transistor 332 or 342. As a result, a much larger current is drawn through mirroring transistor 331 or 341 than is forced through the programming transistor 332 or 342. The output currents from current boost devices 330 and 340 are driven through nodes 105 and 106 respectively.

Figure 4:
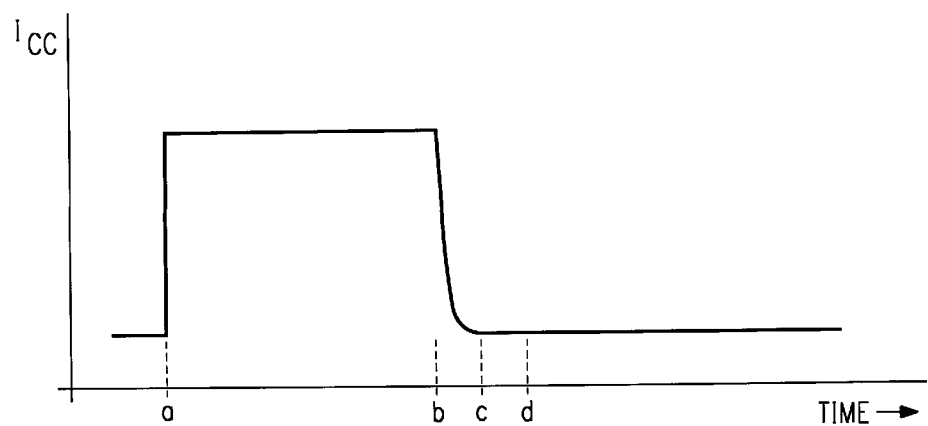
FIG. 4 is a timing diagram illustrating the operation of the quick recovery feedback circuit.

It can be seen by comparison of FIGS. 3 and 4 that quick recovery feedback circuit 300, when activated, operates in a manner similar to main feedback circuit 200, the difference being that the output current driven to node 105 or 106 by quick recovery feedback circuit 300 is much greater than the current generated by main feedback circuit 200. As a result, when quick recovery feedback circuit 300 is activated and there is a potential difference between nodes 103 and 104, circuit 300 will charge or discharge capacitor 190 much more quickly than main feedback circuit 200 would alone. Thus, the feedback voltage will be corrected and nodes 103 and 104 will be driven toward an equal potential much more quickly when quick recovery feedback circuit 300 is in operation.

Referring to FIG. 4, a timing diagram illustrating the operation of quick recovery feedback circuit 300 is shown. The graph shows the total feedback current as a function of time. Before time (a), main feedback circuit 200 conducts a small current to correct the bias of a first read head. At time (a), a read head change occurs, and quick recovery feedback circuit 300 is activated. Circuit 300 conducts a maximum current until a time (b), when the potential difference between nodes 103 and 104 approaches zero. After time (b), the voltages of nodes 103 and 104 rapidly equalize, reaching an equal potential at time (c).

At this point, two things occur: First, current sink transistors 352 and 354 sink the entire current being produced by current mirrors 310 and 320, respectively, so that current boost devices 330 and 340 receive no input current. Thus, no current is output from current boost devices 330 and 340 to nodes 105 and 106, and quick recovery feedback circuit 300 has no further effect on circuit 100 so long as nodes 103 and 104 remain at the same potential. Second, offset detect block 160 triggers delay block 170. At time (d), delay block 170 ceases to send a high signal to AND gate 180, thereby deactivating quick recovery feedback circuit 300.

While the invention has been particularly shown and described by the foregoing detailed description, it will be understood by those skilled in the art that various other changes in form and detail may be made without departing from the spirit and scope of the invention.

What is claimed is:

1. A method for providing feedback to a selected read head circuit having a read head bias voltage in a multi-head disk drive, comprising the steps of:

generating first and second currents in response to the read head bias voltage;

generating third and fourth currents in response to the read head bias voltage;

selecting one of the third and fourth currents;

amplifying the selected one of the third and fourth currents to produce an amplified current;

supplying the first current to a first charge plate of a capacitor;

supplying the second current and the amplified current to a second charge plate of the capacitor;

supplying a potential level associated with the first charge plate of the capacitor to a first voltage input of the read head circuit; and supplying a potential level associated with the second charge plate of the capacitor to a second voltage input of the read head circuit.

2. The method of claim 1, wherein the step of generating the third and fourth currents comprises the steps of:

receiving at a base terminal of a first transistor a first voltage component of the read head bias voltage;

receiving at a base terminal of a second transistor a second voltage component of the read head bias voltage;

sinking a current from emitter terminals of the first and second transistors;

receiving at a first current mirror a current conducted by the first transistor, and generating the third current; and receiving at a second current mirror a current conducted by the second transistor, and generating the fourth current.

3. The method of claim 1, further comprising the step of supplying a read head selection signal to the read head circuit.

4. The method of claim 1, further comprising the steps of generating a read head change signal in response to a change in selected read head circuits, and generating an offset detect signal in response to a change in the read head bias voltage, wherein the step of generating the third and fourth currents is performed in response to the read head change signal and the offset detect signal.

5. The method of claim 1, wherein the capacitor is an external capacitor.

6. A system for providing feedback to a selected read head circuit in a multi-head disk drive read circuit, comprising:
  a first feedback circuit for receiving an output voltage from first and second voltage output nodes of the read circuit, and for providing first and second output currents to corresponding first and second charge plates of a capacitor;
  a second feedback circuit for receiving the output voltage from the voltage output nodes of the read circuit, and for providing third and fourth output currents to the first and second charge plates, respectively, of the capacitor;
  first and second feedback lines for supplying voltages associated with the first and second charges plates, respectively, of the capacitor to corresponding first and second voltage inputs of the selected read head circuit; and
  a switch for activating the second feedback circuit.

7. The system of claim 6, wherein the second feedback circuit comprises:
  a voltage-to-current converter for receiving the output voltage from the voltage output nodes of the read circuit, and for producing first and second converter output currents;
  a current amplifier for receiving the converter output currents, and for providing and outputting third and fourth output currents.

8. The system of claim 7, wherein the voltage-to-current converter comprises:
  a constant current sink; and
  first and second matched transistors, each transistor having a base terminal electrically connected to a corresponding one of the voltage output nodes of the read circuit and an emitter terminal electrically connected to the constant current sink, and each transistor conducting a current equal to a corresponding one of the converter output currents.

9. The system of claim 8, wherein the voltage-to-current converter further comprises:
  a first current mirror, for detecting the current conducted by the first transistor and for generating the first converter output current; and
  a second current mirror, for detecting the current conducted by the second transistor and for generating the second converter output current.

10. The system of claim 7, wherein the current amplifier comprises:
  a constant voltage source;
  a first transistor having base, emitter and collector terminals, the collector terminal receiving a selected one of the converter output currents;
  a second transistor having base, emitter and collector terminals, the base terminal of the second transistor being electrically connected to the base terminal of the first transistor;
  a resistance electrically connected between the constant voltage source and the emitter terminal of the second transistor;
  an amplifier adjuster electrically connected between the collector terminal of the first transistor and the base terminal of the first transistor, for varying the voltage of the base terminal of the first transistor in accordance with the selected one of the converter output currents; and
  an output conductor electrically connected to the emitter terminal of the second transistor, for conducting a selected one of the third and fourth output currents.

11. The system of claim 6, further comprising:
  a voltage offset detector for receiving the output voltage from the voltage output nodes of the read circuit, for determining whether the output voltage of the read circuit is above or below a selected threshold, and for providing a logical output signal; and
  a logic gate for causing the switch to activate the second feedback circuit, the logic gate receiving the logical output signal of the voltage offset detector and a read head change indication signal.

12. The system of claim 11, wherein the logic gate comprises an AND gate.

13. The system of claim 6, wherein the first feedback circuit comprises:
  a constant current sink; and
  first and second matched transistors, each transistor having a base terminal electrically connected to a corresponding one of the voltage output nodes of the read circuit and an emitter terminal electrically connected to the constant current sink, and each transistor conducting a corresponding one of the output currents of the first feedback circuit.

14. A read circuit for a multi-head disk drive, comprising:
  a plurality of read head circuits, each read head circuit having first and second voltage inputs, first and second current outputs, and a magneto-resistive read head;
  a current-to-voltage converter, for receiving the first and second current outputs of a selected one of the read head circuits, and for generating first and second voltage outputs; and
  a quick recovery feedback circuit having
    a voltage-to-current converter for receiving the first and second voltage outputs of the current-to-voltage converter, and for producing first and second output currents;
    a current amplifier for receiving a selected one of the output currents of the voltage-to-current converter, and for providing an amplified output current; and
    a capacitor for receiving the amplified output current and for providing first and second feedback voltages to the first and second voltage inputs, respectively, of the selected one of the read head circuits.

15. The circuit of claim 14, wherein the voltage-to-current converter comprises:
  a first constant current sink;
  first and second matched transistors, each transistor having a base terminal for receiving a corresponding one of the voltage outputs of the current-to-voltage converter, each transistor having an emitter terminal electrically connected to the first constant current sink, and each transistor conducting a current to the constant current sink; and
  first and second current mirrors, each current mirror receiving the current conducted by a corresponding one of the matched transistors and driving a corresponding one of the output currents of the voltage-to-current converter.

16. The circuit of claim 14, wherein the current amplifier comprises:
  a constant voltage source;
  a second constant current sink for receiving the selected one of the output currents of the voltage-to-current converter, for reducing the received current, and for generating an output current;
  a first transistor having base, emitter and collector terminals, the collector terminal receiving the output current of the second constant current sink;

a second transistor having base, emitter and collector terminals, the base terminal of the second transistor being electrically connected to the base terminal of the first transistor, the emitter terminal of the second transistor being electrically connected to the selected one of the feedback conductors;

a resistance electrically connected between the constant voltage source and the emitter terminal of the second transistor; and an amplifier adjustment device electrically connected between the collector terminal of the first transistor and the base terminal of the first transistor, for varying a voltage applied to the base terminal of the first transistor in accordance with the selected one of the output currents of the voltage-to-current converter.

17. The circuit of claim 14, further comprising a read head selector, for receiving a read head indication signal, and for generating a plurality of read head selection signals, and wherein each read head circuit further comprises a select input for receiving a corresponding one of the read head selection signals.

18. The circuit of claim 14, further comprising a main feedback circuit, the main feedback circuit having:

a third constant current sink; and first and second matched transistors, each transistor having a base terminal electrically connected to a corresponding one of the voltage output nodes of the read circuit and an emitter terminal electrically connected to the third constant current sink, and each transistor conducting a corresponding one of the output currents of the main feedback circuit.

19. The circuit of claim 14, wherein the plurality of read head circuits, the current-to-voltage converter, the voltage-to-current converter of the quick recovery feedback circuit, and the current amplifier of the recovery feedback circuit are formed as an integrated circuit on a single substrate.

* * * * *

UNITED STATES PATENT AND TRADEMARK OFFICE
CERTIFICATE OF CORRECTION

PATENT NO : 6,061,192
DATED : May 9, 2000
INVENTOR(S): Hisao Ogiwara

It is certified that error appears in the above-identified patent and that said Letters Patent are hereby corrected as shown below:

ON THE TITLE PAGE

On the face of this patent, please insert the following after "Related U.S. Application Data":

Provisional application No. 60/023,446 August 19, 1996.

Signed and Sealed this

Eighth Day of May, 2001

*Attest:*

NICHOLAS P. GODICI

*Attesting Officer*   *Acting Director of the United States Patent and Trademark Office*